United States Patent

[11] 3,598,043

| [72] | Inventor | Richard William Schuff<br>Phoenix, Ariz. |
|---|---|---|
| [21] | Appl. No. | 835,001 |
| [22] | Filed | June 20, 1969 |
| [45] | Patented | Aug. 10, 1971 |
| [73] | Assignee | Dart Industries Inc.<br>Los Angeles, Calif. |

[54] PRINTING MACHINE FOR CONICAL CUPS
4 Claims, 15 Drawing Figs.

[52] U.S. Cl. .................................................. 101/40,
118/230, 198/25, 302/2
[51] Int. Cl. .................................................. B41f 17/28
[50] Field of Search ................................. 101/38-
—40, 35; 118/230

[56] References Cited
UNITED STATES PATENTS

| 988,603 | 4/1911 | Treiber | 101/40 |
|---|---|---|---|
| 3,162,115 | 12/1964 | Bauer | 101/39 |
| 3,389,811 | 6/1968 | Frank | 101/40 UX |
| 3,398,678 | 8/1968 | Usko | 101/38 |

FOREIGN PATENTS

| 613,023 | 11/1948 | Great Britain | 101/39 |
| 1,290,360 | 3/1962 | France | 101/38 |

Primary Examiner—Robert E. Pulfrey
Assistant Examiner—Clifford D. Crowder
Attorneys—Paul R. Wylie, Harold R. Beck and Leigh B. Taylor ABSTRACT: A printing machine for conical cups including a turret and individual cup-holding means mounted on the turret. The cup-holding means are rotated with the turret in a single plane to permit high speed printing. Alternate ink applicator rollers are spaced between the cup-holding means. To prevent sliding of the cup surface on the printing plate, the cup-holding means are positioned such that they will rotate the cup surface over the printing surface.

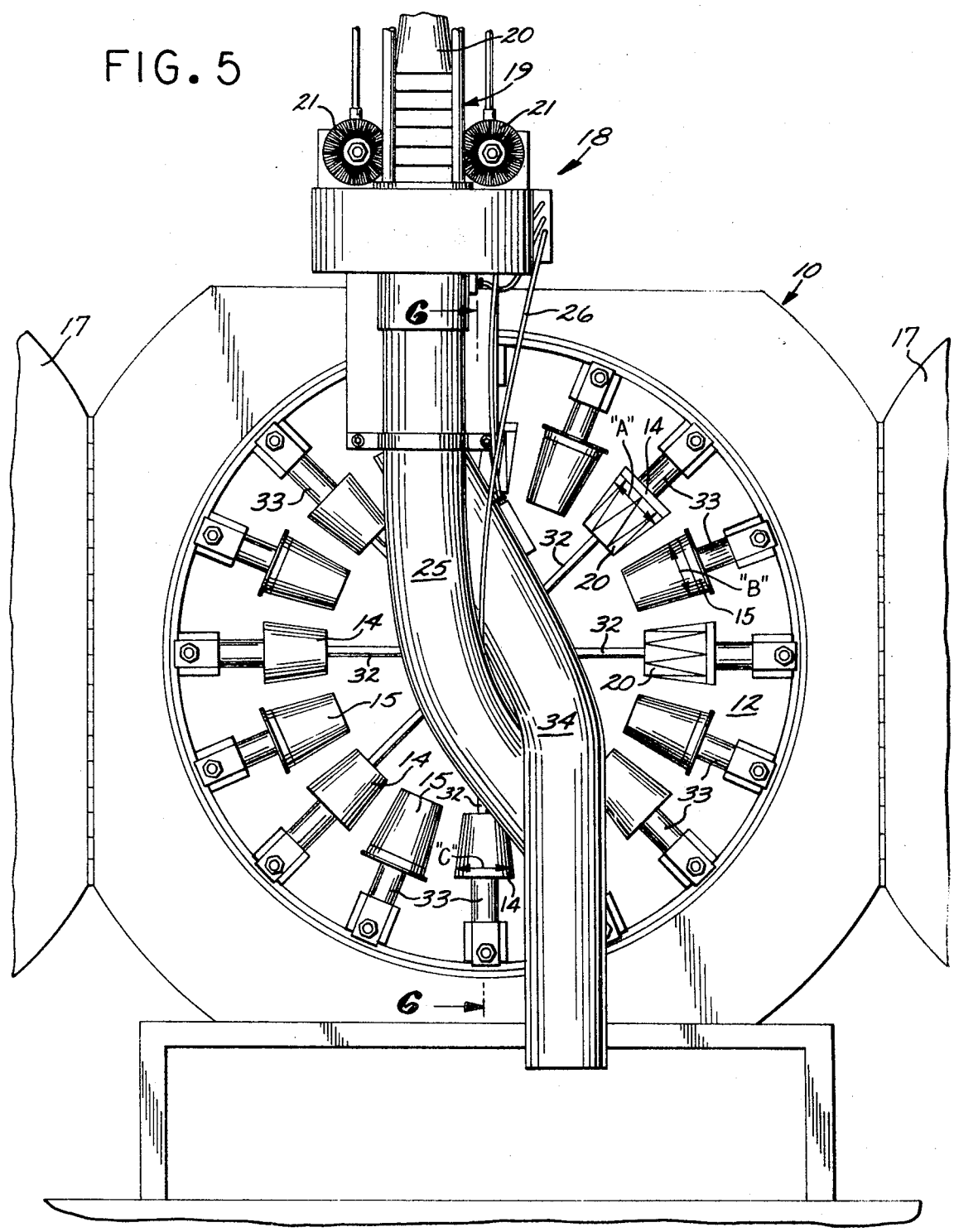

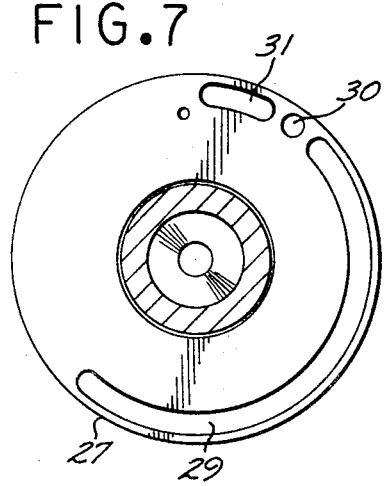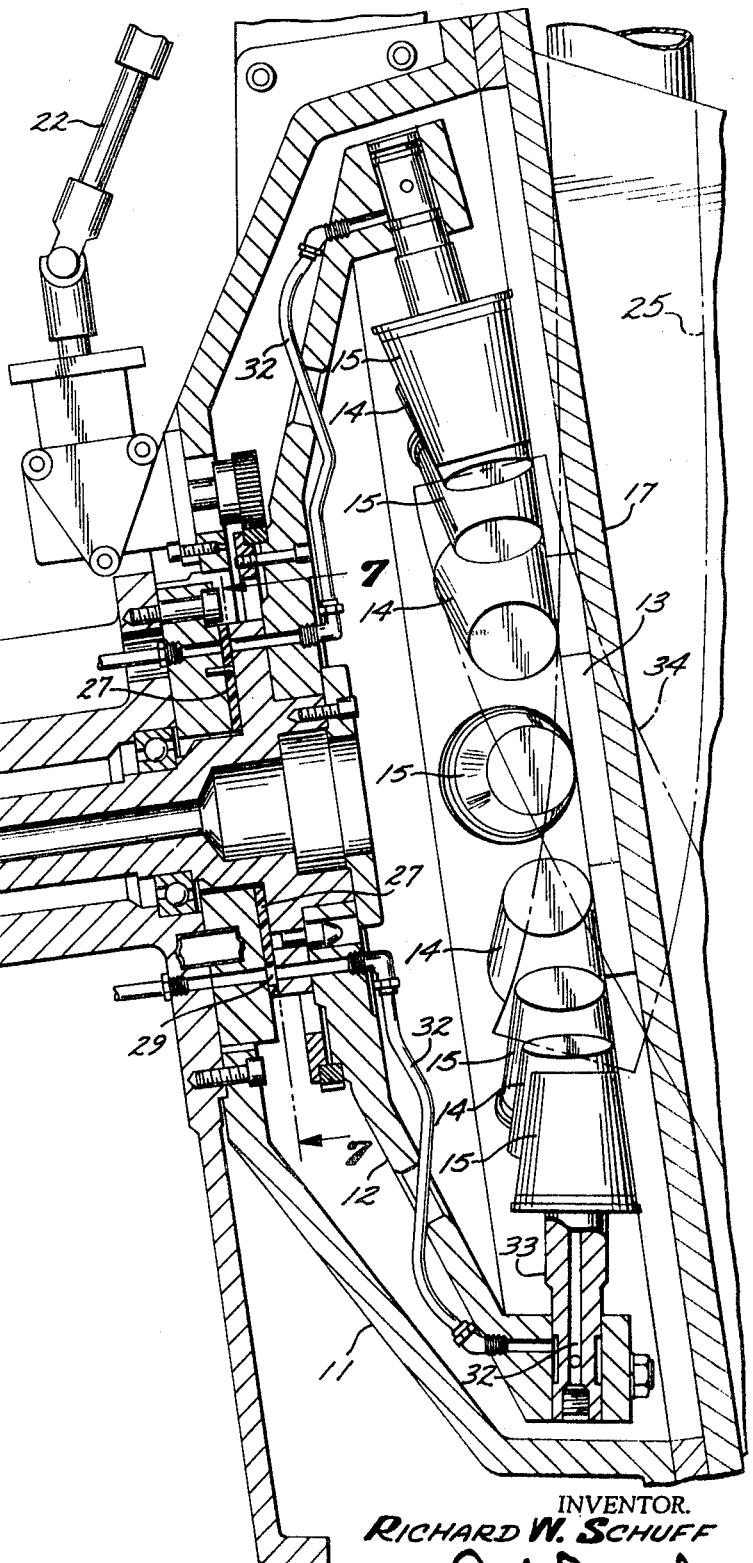

PATENTED AUG 10 1971 3,598,043

INVENTOR.
RICHARD W. SCHUFF
BY
Paul R. Wylie
ATTORNEY

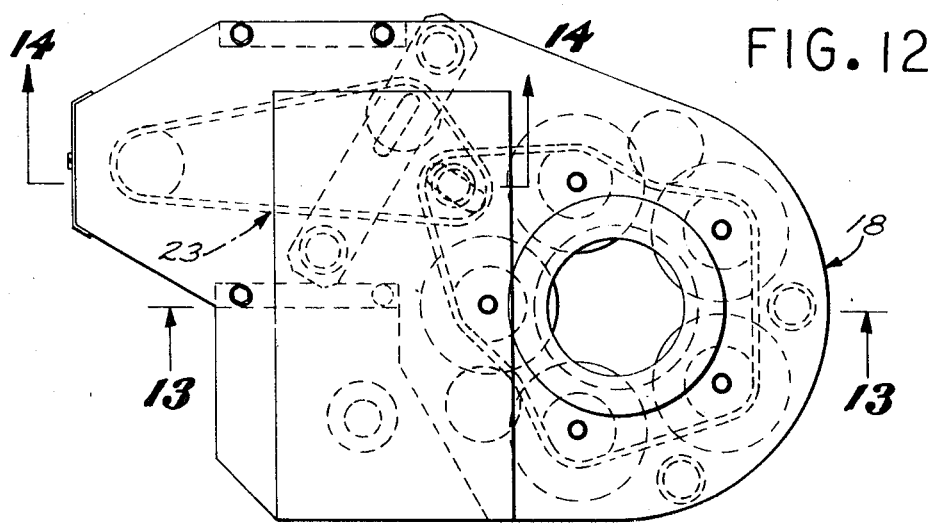
FIG.12
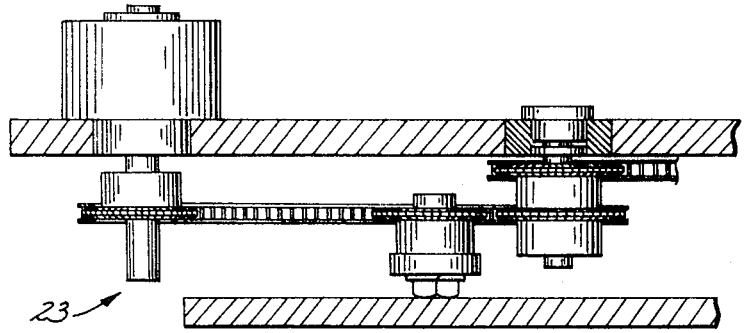
FIG.14
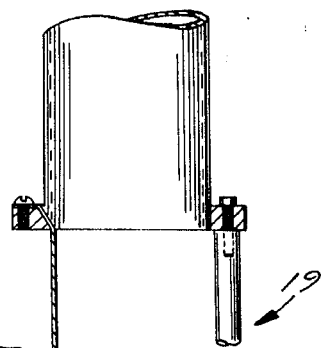
FIG.13
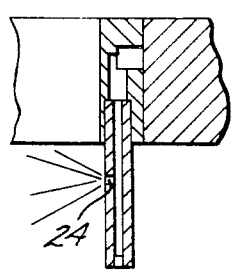
FIG.15
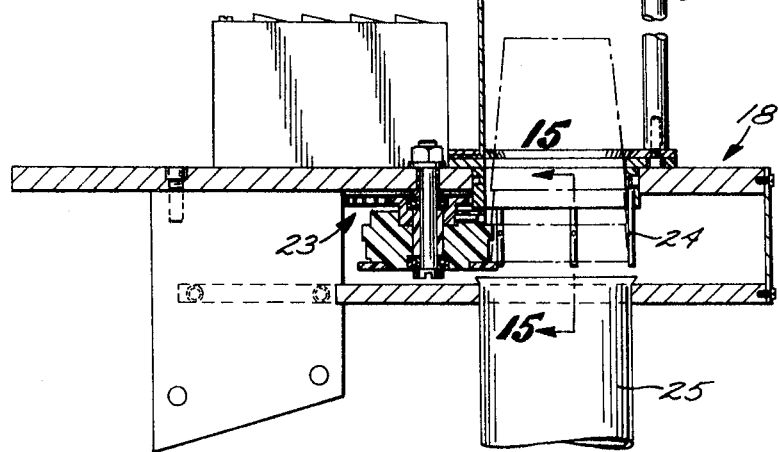
INVENTOR.
RICHARD W. SCHUFF
BY Paul R. Wyler
ATTORNEY

PRINTING MACHINE FOR CONICAL CUPS

This invention relates generally to the apparatus, methods and techniques for printing and/or embossing cups or the like. More specifically, this invention relates to apparatus for printing conical cups. The invention is particularly useful for printing and/or embossing cups of foamed plastic material.

The development of printing techniques for mass-produced cups is highly important inasmuch as purchasers of such cups are becoming increasingly concerned over the ability to print cups with attractive indicia, labels and the like. Of importance in printing cups are the considerations of clarity of printing, utilization of the cup surface, elimination of overlap of printed materials, etc.

Prior art printing apparatus and techniques are disclosed in U.S. Pats. 2,425,928; 3,202,595; 3,162,115; 3,195,451; 3,302,560; 3,302,580; 3,398,678 and 2,019,537. These patents show a variety of printing machines. However, notwithstanding this multitude of various printing apparatus there still remains several basic problems caused by requirements in cup printing. Among the requirements is the fact that speeds in excess of 100 cups per minute are desirable to efficiently adapt the cup-printing machine to the remainder of the cup-production line. Moreover, there is some difficulty in the prior art due to sliding of the cup surface with respect to the printing plate from which ink is passed. This sliding sometimes causes smearing of the ink on the cup surface and other deleterious visual defects.

Accordingly, it is an object of this invention to provide a cup-printing apparatus wherein maximum printing speeds can be obtained.

Another object of this invention is to provide for the feeding and removal of cups to the cup-printing machine that will be equally as efficient as the machine itself.

Another object of this invention is to provide a holder for a cup that is to be printed whereby there will be no friction or sliding of the cup surface with respect to the printing surface.

Yet another object of the invention is provision of ink application means in connection with the foregoing apparatus.

Another object of the invention is a provision of heated ink applicator means whereby the ink will dry upon the printed cup due to the heat imparted thereto by the ink applicator.

According to the invention, there is provided an apparatus for printing and/or embossing cups or the like utilizing a rotatably mounted turret means that is adapted to pass cups adjacent a printing plate means for applying ink and/or embossing the cups while the cups are being rotated on the turret. Individual rotatable cup-holding means are mounted on the turret in a plane perpendicular to the longitudinal axis of the turret means. The individual cup-holding means are mounted with the frustum thereof being positioned radially inwardly from the base and in such a manner that the surface of the cup can be rolled evenly and smoothly across the surface of the printing plate. This is accomplished by having the individual cup-holding means positioned a distance from the longitudinal axis of the turret so that the apex of the cone formed by the sides of the cup will intersect at the longitudinal axis.

A feature of this invention is a provision of printing ink applicator roller means mounted on the turret and interspersed between the individual cup-holding means. An ink applicator is provided to cover the ink applicator roller means with ink which will be carried by such roller means and applied to the printing plate immediately before a cup to be printed is rolled across said later plate. In a preferred embodiment, the ink applicator means are interspersed between the individual cup-holding means whereby a fresh supply of ink will be supplied to the printing plate for each cup.

Other features of the invention include the provision of hinged door means mounted on the housing and carrying both printing plate and ink applicator means whereby such can be swung toward and away from and into contact with both the ink applicator rollers and the cups carried by the individual cup-holding means.

Another feature of the invention is a provision of pneumatic feeder means to enhance the feeding of cups onto the rapidly moving printing apparatus.

A specific embodiment of the invention will be more fully described with reference to the drawings wherein:

FIG. 5 is a right-hand side elevation of an apparatus for printing cups as shown in FIG. 1;

FIG. 6 is a view in cross section taken on line 6–6 of FIG. 5 with parts of the printing machine feeding apparatus shown in phantom lines thereon;

FIG. 7 is a plan view of a valve plate used in the apparatus for printing;

FIG. 10 is a view similar to FIG. 11 and showing the relationship of cups, cup-holding means and ink applicator means in relationship to the embossing and printing plate as shown in FIG. 3;

FIG. 12 is an elevation view showing the camming arrangement used to feed cups in accordance with the invention;

FIG. 14 is a view in cross section taken on line 14–14 of FIG. 12;

FIG. 13 is a view in cross section taken on line 13–13 of FIG. 12; and

FIG. 15 is an enlarged fragmentary view of the air assist apparatus for feeding cups as shown in FIG. 13.

Figures 1, 2, 3:
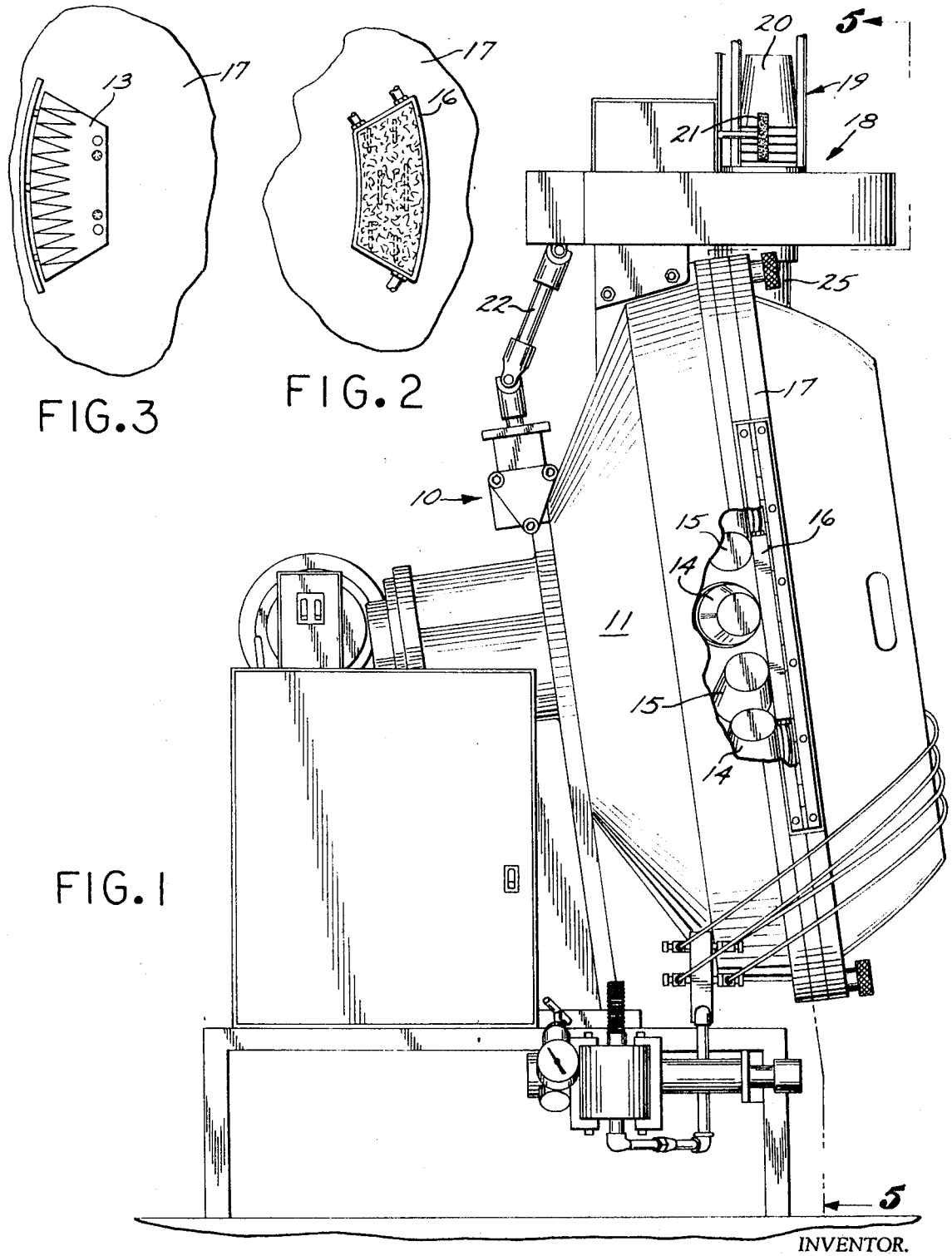
FIG. 1 is a right side elevation view of an apparatus for printing cups according to the invention.
FIG. 2 is a top plan view of a porous printing plate used in accordance with the invention.
FIG. 3 is a top plan view of an embossing printing plate used in accordance with the invention.
Figure 4:
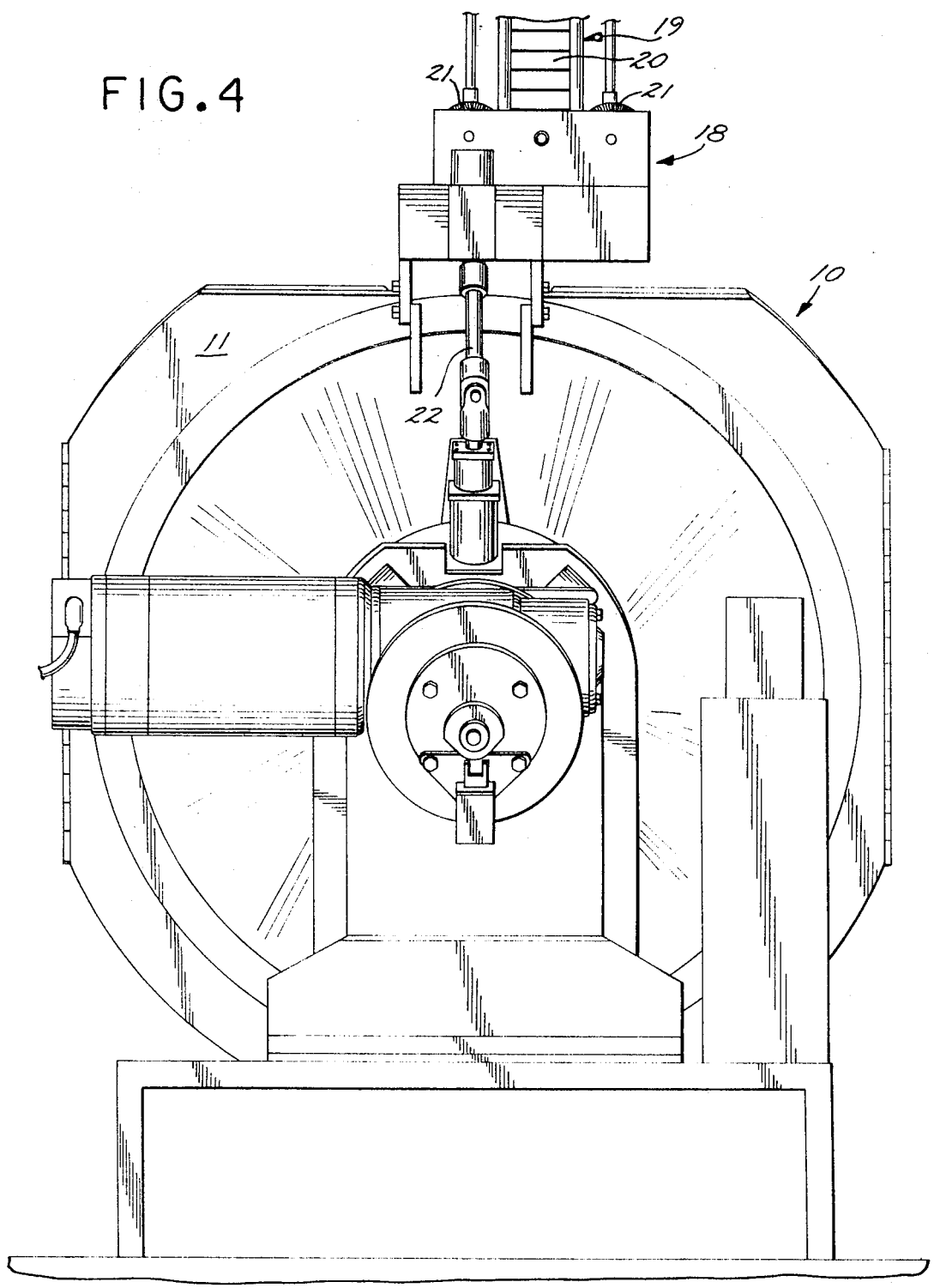
FIG. 4 is a left side elevation of the apparatus for printing cups as shown in FIG. 1.
Figure 8:
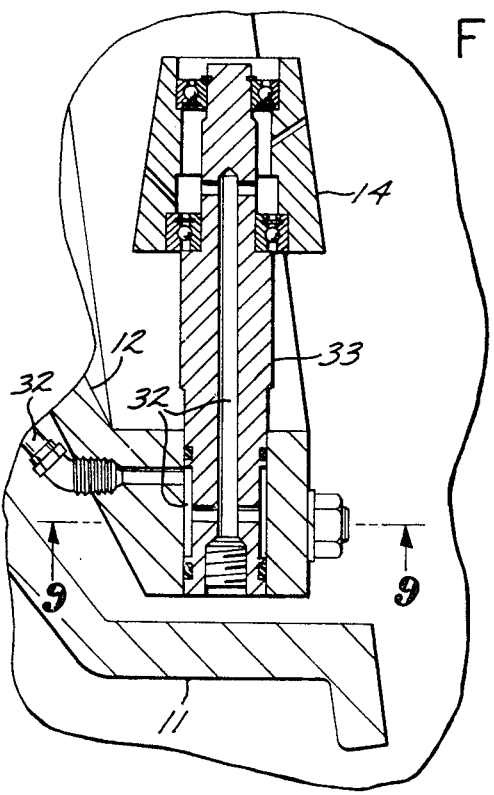
FIG. 8 is an enlarged cross section view of an individual cup holding means according to the invention.
Figure 9:
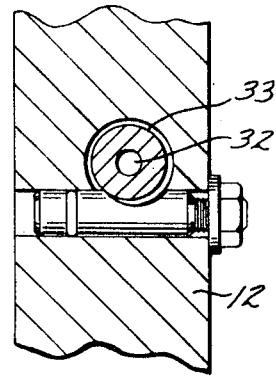
FIG. 9 is a view in cross section taken on line 9–9 of FIG. 8.
Figure 11:
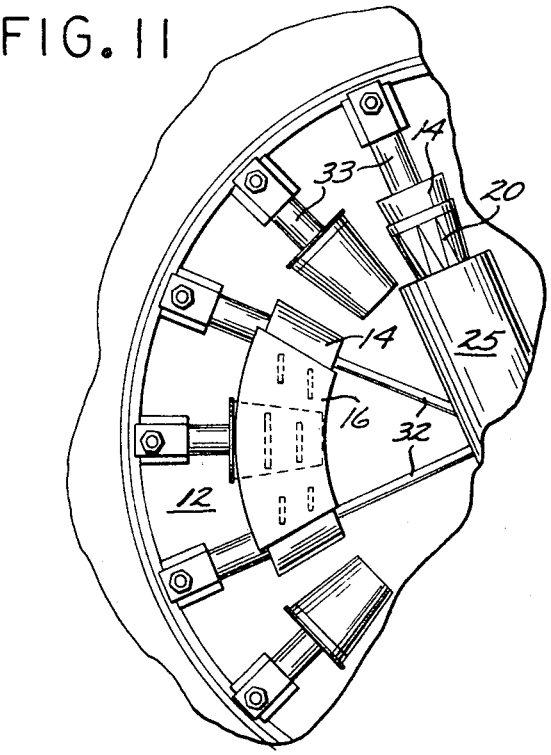
Figure 10:
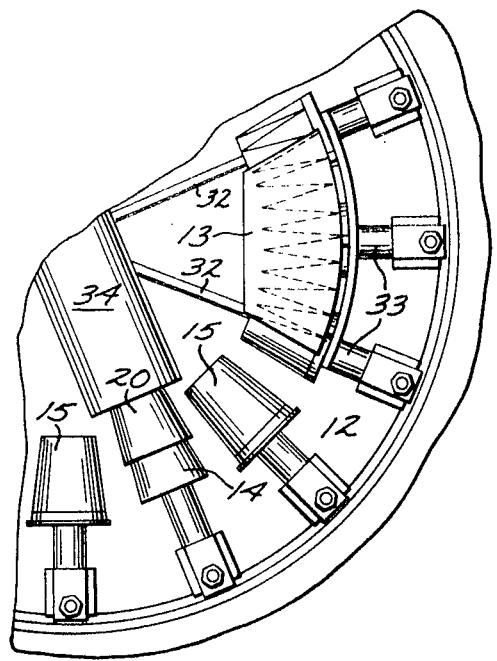
FIG. 10 is a fragmentary right-hand side elevation view similar to FIG. 5 and showing the relationship of cups and ink applicator roller means with respect to an ink applicator plate as shown in FIG. 2.

Referring now to the drawings, an apparatus for printing and/or embossing cups according to the invention is shown generally at 10. The apparatus includes a housing 11 and a rotatable turret 12. Printing plate 13 is provided on the housing as will be hereinafter described. Upon turret 12 are mounted cup-holding means 14 and printing ink rollers 15. The housing 11 also includes an ink applicator 16. Both the ink applicators and cup-holding means 15 and 14 respectively are mounted for rotation on supports about the periphery of turret 12. In operation, cups are positioned upon cup holding means 14 while the turret is rotated. Ink applicator rollers 15 are interspersed between the cup holders. The ink applicator 16 is provided for covering printing ink roller 15. The ink applicator roller in turn applies the printing ink to printing plate 13. Both the ink applicator and printing plate are mounted on hinged doors 17 of the apparatus housing 11 and can be pivoted into contact with the cups and rollers by simply closing the doors.

As shown, the individual cup-holding means 14 are frustoconical in shape and are mounted for rotation in a plane perpendicular to the longitudinal axis about which the turret means rotates. The frustum of the cup-holding means is positioned inwardly and at a distance from the longitudinal axis such that the apex of the cone formed by the sides of the cup would fall substantially at the longitudinal axis of the turret means. Thus, the cup-holding means is rolled across the printing plate evenly and without slipping. A cup-holding means not so disposed would result in slipping of the cup surface or the printing plate.

Cups are fed onto the printing and embossing apparatus by means of feeder 18. The feeder includes a magazine 19 in which cups 20 are stacked in inverted nested relationship. A pair of rotating grippers 21 feed the cups. The grippers and the feeding mechanism are operated by power applied through coupling 22 to operate cam-timing system 23. As the cups are fed, they are separated one from the other by an air jet 24 which forces compressed air between the cups to aid in separation. The cups are then dropped into vacuum feeding tube 25 upon which a negative pressure is obtained by vacuum line 26.

Cups 20 as they pass down feeding tube 25 are positioned on cup holders 14. This positioning is aided by the creation of a negative pressure on the upper surface of the cup holders. As best seen in FIG. 6, a vacuum from a source not shown is applied through valve plate 27 having apertures 29 and 30 and 31 as shown in FIG. 7. The valve plate 27 is provided so that vacuum can be applied during the length of the cycle that conduit 32 of the valve system is in communication with aperture 29. Aperture 30 is a neutral aperture present to break the vacuum on the cups and exhaust aperture 31 is provided for communication between a pressurized air source not shown and conduit 32 so that the cups will be blown off the cup holders 14 when they reach the proper position. As shown, conduit 32 runs through support 33 to the cup surface of cup-holding means 14. Cups that are blown off cup-holding means by air supplied through exhaust aperture 31 of valve plate 27 are further drawn down discharge tube 34 by negative pressure created therein by vacuum line 35.

It is possible to use a printing plate 13 of porous material wherein ink can be forced through the material to the surface thereof. With this type of an arrangement, printing ink rollers 15 are not necessary and these rollers can be replaced with cup-holding rollers 14 thereby doubling the output of the apparatus. Moreover, it is possible to heat the printing plate to promote rapid drying of the printed and/or embossed cups.

As shown in FIG. 3, the surface of printing plate 13 is relieved in certain areas to thereby provide an embossed surface on cups that come in contact therewith. The diameters of the individual cup-holding means 14 are less than the diameters of printing ink applicator roller means 15 by about twice the wall thickness of the cup to be printed thereon. Thus, referring to FIG. 5, dimension "A" and dimension "B" can be substantially equal whereas dimension "C" is less than dimension "A" or "B" by about twice the wall thickness of cup 20.

Having described a specific embodiment of the invention, what I now claim is:

1. An apparatus for printing tapered cups or the like comprising, a turret means mounted for rotation with respect to a longitudinal axis thereof;

a printing plate means for applying printing to cups while said cups are positioned on said turret means; and, individual cup-holding means mounted on said turret means, said cup-holding means being frustoconical and being mounted for rotation in a plane perpendicular to said longitudinal axis and each of said cup means being rotatably mounted on a radial axis with respect to the longitudinal axis of said turret means; said individual cup-holding means being mounted with the frustum thereof positioned radially inwardly from the base thereof, said individual holding means being positioned on said turret means in a manner such that the surface of a cup placed on said holding means will be rolled across the surface of said printing plate means when said turret is rotated;

printing ink applicator roller means mounted on said turret, said roller means being frustoconical and being mounted for rotation in a plane perpendicular to said longitudinal axis and each of said printing ink applicator roller means being rotatably mounted on radial axis, said roller means being mounted with the frustum thereof positioned radially inwardly from the base thereof, said roller means being interspersed with said cup-holding means and said roller means being positioned in a manner such that the surface thereof will be rolled across the surface of said printing plate means when said turret is rotated; and, ink applicator means having an ink supplying surface positioned such that said printing ink applicator rollers will roll across said surface when said turret is rotated.

2. An apparatus according to claim 1, wherein said printing ink applicator roller means are alternately interspersed with said individual cup-holding means.

3. An apparatus according to claim 1, further comprising a housing around said turret means, and hinged door means mounted on said housing, said printing plate means and said ink applicator means being mounted on said door means for positioning away from said individual cup-holding means and said ink applicator means when said door means are open and in operative position thereto when said door means are closed.

4. An apparatus according to claim 1, wherein the diameter of said individual cup-holding means is less than the diameter of said printing ink applicator roller means by about twice the wall thickness of cup to be printed thereon.